Patented July 1, 1952

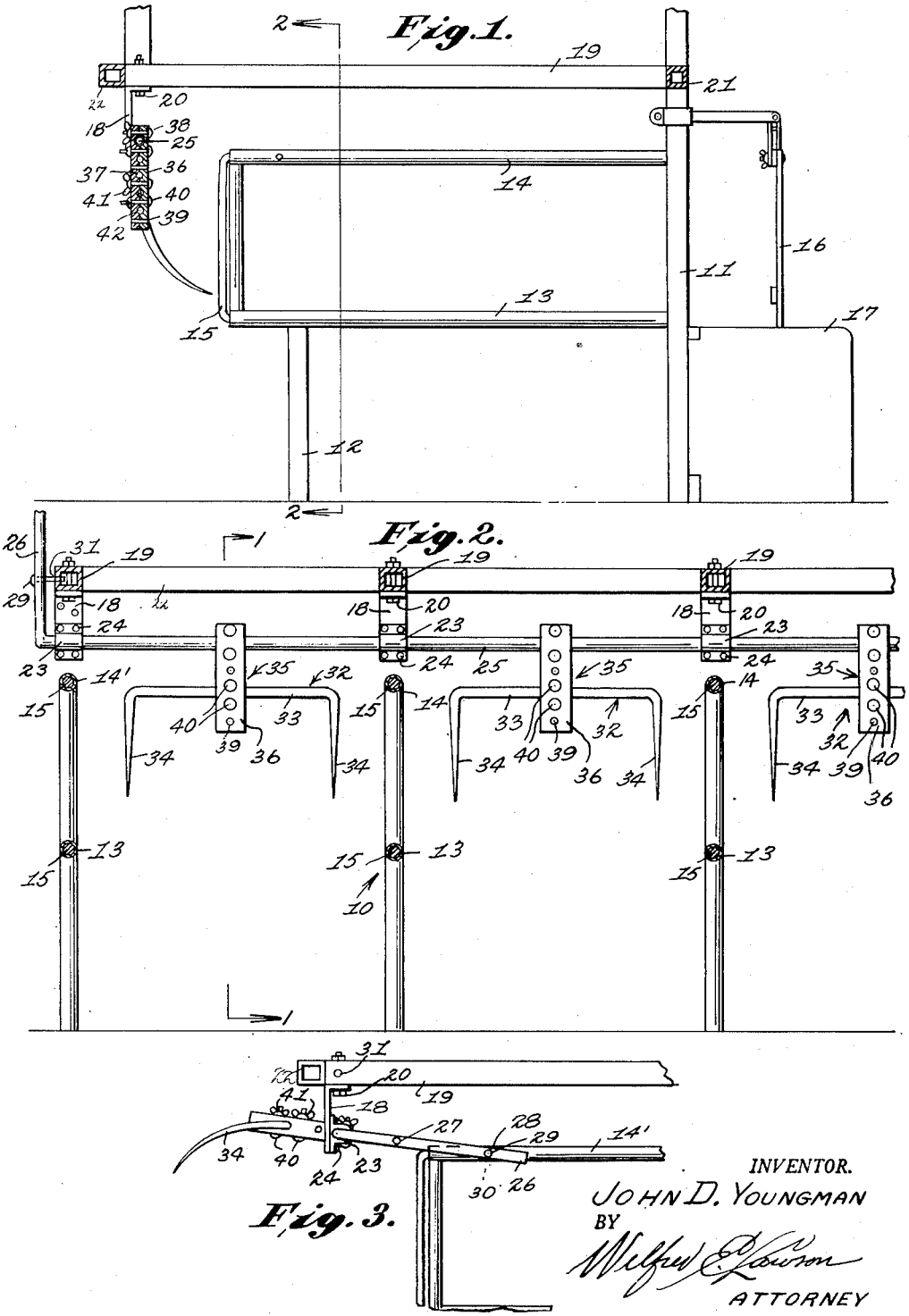

2,601,845

UNITED STATES PATENT OFFICE 2,601,845

STALL WITH RETAINING GATE

John D. Youngman, Sleepy Eye, Minn.

Application March 25, 1949, Serial No. 83,499

2 Claims. (Cl. 119—27)

This invention relates to a retaining gate for an animal's stall.

The object of the invention is to provide a gate structure which will enable a person to confine animals in their stalls as desired.

Another object of the invention is to provide a gate structure for a barn, the barn having a plurality of stalls therein, whereby the animals can be released from their stalls either individually or collectively.

A further object of the invention is to provide a stall gate structure which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a sectional view taken on the line 1—1 of Figure 2;

Figure 2 is a sectional view taken on the line 2—2 of Figure 1;

Figure 3 is a fragmentary side elevational view showing the gate in raised position.

Referring in detail to the drawings, there is shown a plurality of stalls 10 for confining animals therein, the stalls 10 being arranged in side-by-side relation with respect to each other, and the stalls may be arranged in a suitable barn structure. Each of the stalls 10 has the same structure and function as the stall described in my Patent No. 2,547,426 of April 3, 1951.

Thus, each stall 10 is defined by a pair of vertically disposed spaced parallel front posts 11. A standard 12 is arranged to the rear of each of the posts 11, and suitably spaced parallel horizontally disposed guide rails 13 and 14 are supported by the standards and posts. A U-shaped partition 15 is slidably arranged in the open rear ends of the rails 13 and 14 whereby the length of the stalls 10 can be adjusted as desired. Arranged at the front of each stall is a gate 16 which is positioned above a manger 17.

Each of the stalls 10 has its rear end open for the passage of the animals into and out of the stalls. The present invention is directed to a gate structure for preventing animals from accidentally leaving the stalls. The retaining gate structure is so constructed that the animals can be released from all of the stalls collectively or else, an animal may be released from only one of the stalls at a time.

The retaining gate structure comprises a plurality of vertically disposed braces 18 which are secured to horizontally disposed overhead joists 19, each of the joists 19 having its front and rear ends supported by horizontally disposed beams 21 and 22. The upper end of each of the braces 18 is secured to the rear end of the complemental joist 19 by suitable securing elements, such as bolt and nut assemblies 20. A bearing block or bracket 23 is secured to the lower end of each of the braces 18 by means of suitable securing elements such as bolt and nut assemblies 24.

A horizontally disposed rotatable pipe or shaft 25 extends longitudinally along the rear of the stalls 10, and the shaft 25 is rotatably supported by the bearing blocks 23. For rotating the shaft 25, a handle portion 26 is secured to one end thereof or is formed integral therewith. A pair of suitable apertures 27 and 28 are arranged in the handle portion 26 and a pin 29 is adapted to be inserted or projected through one of the apertures 27 or 28 and into a registering aperture 30 in the rail 14', or into the aperture 31, depending on whether or not the retaining gate structure is to be locked in its open or closed position.

Arranged at the rear end of each of the stalls 10 is a U-shaped prong or yoke 32 which may be fabricated of any suitable material. The prongs 32 each include a web 33 and a pair of spaced parallel legs 34 which are curved and have their ends tapered. The tapered ends of the legs 34 are adapted to jab the animal in the event that the animal should attempt to back out of the stall. The prongs 32 are each operatively connected to the shaft 25 by means of a wooden bracket 35. The bracket 35 includes a pair of superposed plates 36 and 37 which are maintained in assembled embracing relation on the pipe 25 by means of bolt and nut assemblies 38.

The plates 36 and 37 are provided with a plurality of spaced registering holes 39, and bolts 40 project through certain of these registering holes for maintaining the web 33 of the prongs 32 therein. A wing nut 41 is arranged in threaded engagement with each of the bolts 40, whereby the tension of the plates 36 and 37 on the web 33 can be adjusted as desired. There is a plurality of coacting aligned arcuate recesses 42 in the plates 36 and 37 for receiving therein the web 33 of the prongs 32. Thus, by positioning the web 33 in the proper recesses 42, and then tightening the nuts 41 on the bolts 40, the prongs 32 can be adjusted vertically in order to adapt the retaining gate for animals of various heights.

From the foregoing, it is apparent that a retaining gate structure for an animal stall has been provided which will enable the release of one animal at a time or else the animals can be released from all of the stalls 10 simultaneously. Thus, to permit all of the animals to leave their stalls simultaneously, the user removes the pin 29 from the registering apertures 27 and 31 and swings the handle 26 in a downward or clockwise movement. This results in a clockwise movement of the shaft 25 to thereby cause the prongs 32 to be raised to an out-of-the-way position, Figure 3, so that the animals may be moved out of their stalls. The pin 29 can then be inserted through the registering apertures 28 and 30 to lock the gate in its open position. To release any animal from its respective stall, the user need only loosen the wing nuts 41 on the bolts 40 and then pivot or swing the proper or desired prong 32 to its raised position so that the animal can be moved from its stall.

While I have shown and described a specific embodiment of my invention, this is by way of illustration only and I consider as my own all such modifications in construction as fairly fall within the scope of the appended claims.

I claim:

1. A gate structure for retaining and releasing animals in and from a row of adjacent stalls, comprising a shaft coextensive with the row at the rear ends of said stalls, means supporting said shaft at a height that the animals can pass beneath the same, a substantially U-shaped member secured on said shaft in line with each of said stalls, the legs of each of said members being in the form of pointed tines, and means on said shaft for imparting turning movements thereto for lowering and raising said members to and from positions in the rear of animals occupying said stalls.

2. The invention as defined in claim 1, with posts at the front ends of the sides of said stalls, joists extending horizontally from said uprights to points beyond the rear ends of said side walls, a beam extending between and connecting the rear ends of the said joists, braces depending from the rear ends of the joists, bearings carried by said brackets for said shaft, and a hand crank on said shaft constituting the aforesaid means for turning the shaft.

JOHN D. YOUNGMAN.

REFERENCES CITED

The following references are of record in the file of this patent:

UNITED STATES PATENTS

| Number | Name | Date |
|--------|------|------|
| 369,333 | Gibbs | Sept. 6, 1887 |
| 510,365 | Raben | Dec. 5, 1893 |
| 1,009,714 | Batchelder | Nov. 28, 1911 |
| 1,062,119 | Root | May 20, 1913 |
| 1,512,610 | Kolb | Oct. 21, 1924 |